United States Patent
Kameyama

[11] 3,977,488
[45] Aug. 31, 1976

[54] SHIFT LOCKING DEVICE FOR VEHICLE MANUAL TRANSMISSION

[75] Inventor: Tadayosi Kameyama, Yokohama, Japan

[73] Assignee: Nissan Motor Co., Ltd., Yokohama, Japan

[22] Filed: Sept. 10, 1974

[21] Appl. No.: 504,828

[30] Foreign Application Priority Data
Sept. 20, 1973 Japan.............................. 48-109345

[52] U.S. Cl................................. 180/82; 180/82 C; 70/248
[51] Int. Cl.²...................................... B60R 21/10
[58] Field of Search............. 180/82 C, 82 A, 82 R; 70/247, 248; 280/150 SB; 307/10 SB; 340/52 E

[56] References Cited
UNITED STATES PATENTS

| | | | |
|---|---|---|---|
| 1,743,730 | 1/1930 | Rugg et al. | 70/247 X |
| 2,890,581 | 6/1959 | Lewis | 70/248 |
| 3,438,455 | 4/1969 | Redmond | 180/82 C |
| 3,866,488 | 2/1975 | Nakata et al. | 74/475 |

Primary Examiner—Kenneth H. Betts

[57] ABSTRACT

Unless a driver wears a seat belt a solenoid plunger engages a notch in the striking rod operated by a manual shift lever locking it in neutral.

1 Claim, 2 Drawing Figures

U.S. Patent  Aug. 31, 1976  3,977,488

SHIFT LOCKING DEVICE FOR VEHICLE MANUAL TRANSMISSION

The present invention relates to a locking device for preventing a manual transmission from shifting into gears. The shift locking device prevents a transmission of a motor vehicle from shifting into gears unless a predetermined safety measure has been taken by a driver.

It is now compulsory to equip automibiles with safety seat belts for the purpose of protecting drivers and occupants from injuries upon collision. However, many still do not wear seat belts while riding in automobiles.

To compel the driver to wear a safety seat belt, it has been previously proposed to provide a warning signal and prevent engine start-up unless the driver wears his safety seat belt. With this proposal, however, it is very inconvenient to wear a seat belt if it is necessary to start the engine merely for the purpose of engine inspection.

An object of the invention is to provide a shift locking device for preventing a manual transmission having a striking rod from shifting into gears unless a predetermined safety measure or measures, such as wearing a safety seat belt, has been taken by a driver. According to the device of the invention, engine start-up is not inhibited.

A particular object of the invention is to provide a shift locking device, for preventing a manual transmission having a striking rod from shifting into gears. A notch is formed in the striking rod of a manual transmission, and a locking plunger is mounted near the manual transmission radially adjacent to the striking rod. The locking plunger thus being engageable with the notch to lock the striking rod against movement.

Figure 1:
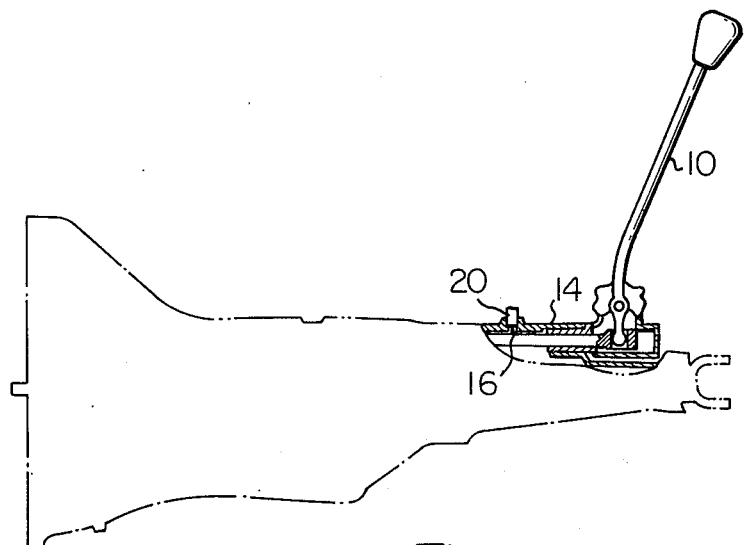
Figure 2:
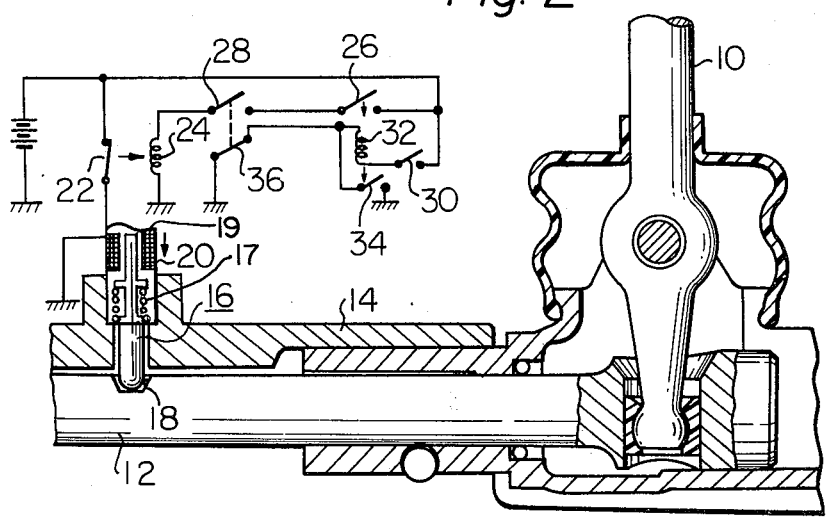

These and other objects, features, and advantage of the invention will become clear from the following description, read in conjunction with the accompanying drawings, wherein:

FIG. 1 is a partial sectional view of a manual transmission showing a manual shift lever and striking rod provided with a shift locking device of the invention; and FIG. 2 is an elarged sectional view of part of FIG. 1 showing a control circuit for the shift locking device.

Referring to the accompanying drawings; and particularly to FIG. 1 there is shown a manual transmission of the conventional type, which shifts into any gear by manipulation of a shift lever 10. Indicated by a reference numeral 12 is a striking rod operatively connecting the shift lever with a change speed gear (not shown).

Referring to FIG. 2, designated by a reference numeral 14 is a transmission case in which mounted a locking plunger 16. Locking plunger 16 is biased by a spring 17 to disengage from a notch 18 formed in striking rod 12, and is urged by solenoid actuator 20 against the biasing force of the spring to engage in the notch 18 to lock striking rod 12 against movement. Locking plunger 16 and notch 18 are so disposed that they align with each other when manual shift lever 10 and striking rod 12 are in the neutral position.

Energization of solenoid 19 of solenoid actuator 20 is initiated by the closure of a normally closed switch 22 which can be opened by a solenoid 24. Solenoid 24 is energized when normally open switches 26 and 28 are closed. Switch 26 is closed when seating sensing switch 30 is closed responsive to the seated condition of a driver on a driver's seat. When the seating sensing switch 30 is closed a solenoid 32 is energized to close switches 26 and 34. It will be noted that switches 30 and 34 form a self-retaining circuit for solenoid 32. Thus even if a normally closed switch 36, which is operatively linked with switch 28, is opened, switch 26 is held closed. When the driver wears the seat belt, switch 28 is closed and switch 36 is opened. It will now be understood that if the driver after sitting on the seat wears a seat belt associated with the seat, the solenoid 24 is energized to open switch 22, thereby permitting the locking plunger 16, under the biasing force, to lift and disengage from the notch 18.

Preferably, a vehicle speed sensing switch (not shown) should be circuited in series with switch 22 so as to prevent locking plunger 16 from engaging notch 18, if the driver takes off the seat belt while driving the automobile and moves the shift lever to the neutral position. The vehicle speed sensing switch should be in the form of a normally closed switch which is opened when the automobile is running.

It will be appreciated from the preceding description that a shift locking device of the invention is very simple in construction and reliable in operation. It will also be appreciated that with the shift locking device of the invention, it is not necessary to wear a seat belt to start the engine for the purpose of engine check-up.

What is claimed is:

1. In a motor vehicle with a manual transmission having a striking rod operated by a manual shift lever to move upon shifting into gears, the combination with the striking rod of notch means formed in said striking rod; a locking plunger engageable in said notch means to lock said striking rod against movement thereof and a electrical switching arrangement so constructed and arranged that it causes said locking plunger to disengage from said notch means when predetermined safety measures have been taken by a driver of the motor vehicle, in which said switching arrangement comprises:
    a first switch which is normally open and is closed when a vehicle seat is occupied;
    a second switch which is normally open and is closed when a safety seat belt associated with the vehicle seat is worn;
    a relay switch cooperating with said second switch, which is closed when said second switch is open and open when said second switch is closed;
    a first relay coil in series with said first switch and said relay switch and having first and second pairs of relay contacts which are normally open, respectively;
    said first pair of relay contacts being in series with said second switch;
    said second pair of relay contacts being in parallel with said relay switch and in series with said first relay coil;
    a second relay coil in series with said first pair of relay contacts of said first relay coil and said second switch and having a pair or relay contacts which is normally closed; and
    means including a solenoid in series with said pair of relay contacts of said second relay coil for biasing said locking plunger to disengage from said notch means when said solenoid is deenergized and for biasing said locking plunger to engage said notch means when said solenoid is energized.

* * * * *